United States Patent
Ohnstad et al.

(10) Patent No.: US 8,389,063 B2
(45) Date of Patent: Mar. 5, 2013

(54) BARRIER-COATING LAYER APPLICATION METHOD

(75) Inventors: Thomas S. Ohnstad, Salem, OR (US); Russell A. Monk, Salem, OR (US)

(73) Assignee: High Impact Technology, Inc., Tigard, OR (US)

( * ) Notice: Subject to any disclaimer, the term of this patent is extended or adjusted under 35 U.S.C. 154(b) by 203 days.

(21) Appl. No.: 12/380,344

(22) Filed: Feb. 25, 2009

(65) Prior Publication Data

US 2009/0169757 A1  Jul. 2, 2009

Related U.S. Application Data

(63) Continuation of application No. 11/412,461, filed on Apr. 26, 2006, now abandoned.

(60) Provisional application No. 60/678,000, filed on May 3, 2005, provisional application No. 60/684,246, filed on May 24, 2005.

(51) Int. Cl.
B05D 1/34 (2006.01)

(52) U.S. Cl. .......... 427/426; 427/421.1; 528/73; 528/75

(58) Field of Classification Search .................. 427/426, 427/421.1; 528/73, 75
See application file for complete search history.

(56) References Cited

U.S. PATENT DOCUMENTS

| | | | |
|---|---|---|---|
| 2,403,836 A | 7/1946 | Wagner | |
| 2,605,138 A | 7/1952 | Paasche | |
| 2,802,763 A | 8/1957 | Freedlander | |
| 3,509,016 A | 4/1970 | Underwood et al. | |
| 3,606,154 A | 9/1971 | Tufts | |
| 3,664,904 A | 5/1972 | Cook | |
| 3,676,197 A | 7/1972 | Harrison et al. | |
| 3,698,587 A | 10/1972 | Baker et al. | |
| 3,801,425 A | 4/1974 | Cook | |
| 4,083,318 A | 4/1978 | Verolme | |
| 4,115,616 A | 9/1978 | Heitz et al. | |
| 4,197,092 A | 4/1980 | Bretz | |
| 4,216,803 A | 8/1980 | Hall | |
| 4,345,698 A | 8/1982 | Villemain | |
| 4,352,851 A | 10/1982 | Heitz et al. | |
| 4,422,561 A | 12/1983 | Grosvenor et al. | |
| 4,467,015 A | 8/1984 | Clem | |
| 4,529,626 A | 7/1985 | Baker et al. | |
| 4,728,711 A * | 3/1988 | Rosthauser et al. | 528/73 |
| 4,783,340 A * | 11/1988 | McDonell et al. | 427/2.1 |
| 4,799,454 A | 1/1989 | Ito | |
| 4,808,042 A * | 2/1989 | Muehlberger et al. | 406/66 |

(Continued)

OTHER PUBLICATIONS

USPTO Office Action, U.S. Appl. No. 12/380,361, dated Aug. 4, 2010, 10 pages.

(Continued)

*Primary Examiner* — Timothy Meeks
*Assistant Examiner* — Nathan T Leong
(74) *Attorney, Agent, or Firm* — Jon M. Dickinson, Esq.; Robert D. Varitz, Esq.

(57) ABSTRACT

A method for spray-creating a composite-material layer on the outside surface of a liquid container to defeat liquid leakage following a projectile penetration of the container. The method includes (a) defining a by-weight percentage blend of two penetration-reaction materials, where the contribution of one such material, an initially liquid and wet-sprayable, but subsequently curable-to-dry, high-elastomeric body-forming material, is larger than that of the other material, which takes the form of a population of dry, liquid-imbibing bead elements, (b) creating weight-percentage-differentiated, simultaneous sprays of these two materials for contact-blending, during spraying, into a composite spray en route in the air toward the region of a target liquid container, and (c) as a part of such creating, controlling the amount of en route, intermaterial, contact blend time between the two materials.

1 Claim, 3 Drawing Sheets

U.S. PATENT DOCUMENTS

| | | | |
|---|---|---|---|
| 5,306,867 A | 4/1994 | Connole et al. | |
| 5,463,791 A * | 11/1995 | Roden | 15/320 |
| 5,472,743 A | 12/1995 | Daluise | |
| 5,691,410 A | 11/1997 | Escarsega et al. | |
| 5,853,215 A | 12/1998 | Lowery et al. | |
| 6,040,356 A | 3/2000 | Kanki et al. | |
| 6,103,641 A | 8/2000 | Gehring, Jr. | |
| 6,358,580 B1 | 3/2002 | Mang et al. | |
| 6,432,882 B1 | 8/2002 | Yamamoto | |
| 6,803,400 B1 | 10/2004 | Butterbach et al. | |
| 7,169,452 B1 * | 1/2007 | Monk et al. | 428/35.7 |
| 7,220,455 B2 | 5/2007 | Bennett et al. | |
| 7,229,673 B1 | 6/2007 | Monk et al. | |
| 7,381,287 B2 | 6/2008 | Monk et al. | |
| 7,393,572 B1 | 7/2008 | Monk et al. | |
| 7,678,453 B2 | 3/2010 | Monk et al. | |
| 7,732,028 B2 | 6/2010 | Monk et al. | |
| 7,785,670 B2 | 8/2010 | Ohnstad et al. | |
| 7,854,968 B2 | 12/2010 | Ohnstad et al. | |
| 7,901,750 B2 | 3/2011 | Atwood et al. | |
| 8,043,676 B2 | 10/2011 | Ohnstad et al. | |
| 2004/0065456 A1 * | 4/2004 | Belli et al. | 174/25 R |
| 2004/0231703 A1 | 11/2004 | McCormick et al. | |
| 2005/0084334 A1 | 4/2005 | Shi et al. | |
| 2005/0100667 A1 * | 5/2005 | Mayer et al. | 427/248.1 |
| 2005/0202181 A1 | 9/2005 | Grossmann et al. | |
| 2006/0121245 A1 | 6/2006 | Lasson | |
| 2006/0269680 A1 | 11/2006 | Bennett et al. | |
| 2009/0004433 A1 | 1/2009 | Privitera et al. | |

OTHER PUBLICATIONS

USPTO Office Action, U.S. Appl. No. 12/380,361, dated Jan. 14, 2011, 10 pages.

USPTO Office Action, U.S. Appl. No. 12/454,243, dated Apr. 13, 2010, 10 pages.

USPTO Office Action, U.S. Appl. No. 11/637,591, dated Dec. 24, 2008, 22 pages.

USPTO Office Action, U.S. Appl. No. 11/637,591, dated Sep. 29, 2009, 15 pages.

USPTO Office Action, U.S. Appl. No. 11/637,591, dated Jun. 10, 2010, 13 pages.

USPTO Office Action, U.S. Appl. No. 11/637,591, dated Dec. 9, 2010, 11 pages.

USPTO Office Action, U.S. Appl. No. 12/228,758, dated Mar. 22, 2011, 9 pages.

* cited by examiner

BARRIER-COATING LAYER APPLICATION METHOD

CROSS REFERENCES TO RELATED APPLICATIONS

This application is a continuation from currently co-pending Regular U.S. patent application Ser. No. 11/412,461, filed Apr. 26, 2006, for "Barrier-Coating Layer Application Method", now abandoned, which prior, regular application claims appropriate, respective priorities to two, then currently, prior-filed U.S. Provisional Patent Applications, including U.S. Provisional Patent Application Ser. No. 60/678,000, filed May 3, 2005, for "Barrier Coating Application Method", and U.S. Provisional Patent Application Ser. No. 60/684,246, filed May 24, 2005, for "Application of Plural-Component, Self-Healing, Anti-Puncture Liquid Container Coating". The full disclosure contents of these three, prior applications are hereby incorporated herein by reference.

BACKGROUND AND SUMMARY OF THE INVENTION

In U.S. patent application Ser. No. 11/067,525, filed Feb. 25, 2005, for "Projectile Barrier and Method", now U.S. Pat. No. 7,169,452 B1, granted Jan. 30, 2007, a special kind of leakage-defeating protective coating for a liquid container is illustrated and described. The content of this U.S. Patent is also hereby incorporated herein by reference for background information purposes.

Fundamentally, that U.S. patent ('452) describes a unique, plural-layer, anti-leakage protective coating which may be applied to the surface of a metallic liquid container, such as to the surface of a metal (steel or aluminum) tank holding hydrocarbon fuel. In the described layer structure of this coating, two different kinds of layers are disclosed and discussed, one of which is formed substantially purely of a high-elastomeric material, and the other of which is a composite material formed of the same high-elastomeric material just mentioned in which there additionally resides a distribution of liquid-imbiber bead-like elements, or beads. Both of these materials are referred to herein as penetration-reaction materials. The high-elastomeric material is referred to also as a body-forming material.

The present invention concerns itself principally with a spray-application manner for creating the second-mentioned one of these two types of layers, namely, for creating the composite-material layer which includes both an elastomeric body, and a distribution therein of liquid-imbiber beads.

According to a preferred practice of the invention, the desired composite-material layer is formed by merging in air, as what is referred to herein as a sprayed-layer blend, and just before application to a target surface on a target liquid container, i.e., en route to that surface) of two independently sprayed streams of material, one of which sprays contains wet, liquid, high-elastomeric material, and the other of which includes dry, liquid-imbiber beads.

As will be learned from the detailed description below, and in relation to the specific, illustrative, composite-material layer shown and described herein, when this detailed description is read along with the accompanying drawings, pre-spray flows of these two kinds of materials are appropriately adjusted relative to one another to end up producing a desired composite-material layer wherein, in the final layer, the sprayed high-elastomeric material accounts for about 78-percent by weight of the layer, and the imbedded, distributed liquid-imbiber beads account for about 22-percent by weight of the final layer.

Additionally, and in accordance with practice of the invention, a user is offered the option of adjusting, differentially, the relative positions of two spray heads which are employed to create, selectively, different characters of air-blended sprays of the two different layer-forming materials. This position adjustability feature allows for both changing the lateral separation between these two spray heads, one for each of the two materials, and also for allowing what is referred to herein as relative longitudinal adjustment so as to position one spray head or the other closer to or further away from an intended target surface where layer formation is to take place. This control adjustability allows a user a relatively wide range of options for composite-material layer formation. It does so by varying the length of time that initially dry liquid-imbiber beads are in contact with still-uncured still-liquid elastomeric material.

Further included in the invention methodology are several proposed and different modalities for delivering the liquid imbiber beads to the associated spray instrumentality (head) which creates a spray of these beads. Included in these modalities, as will seen, are gravity, auger-drive feed, and compressed-air assistance (where desired).

Various other features and advantages that are offered by the present invention will now become more fully apparent as the detailed description of the invention which follows is read in conjunction with the accompanying drawings.

DETAILED DESCRIPTION OF THE INVENTION

Figure 1:
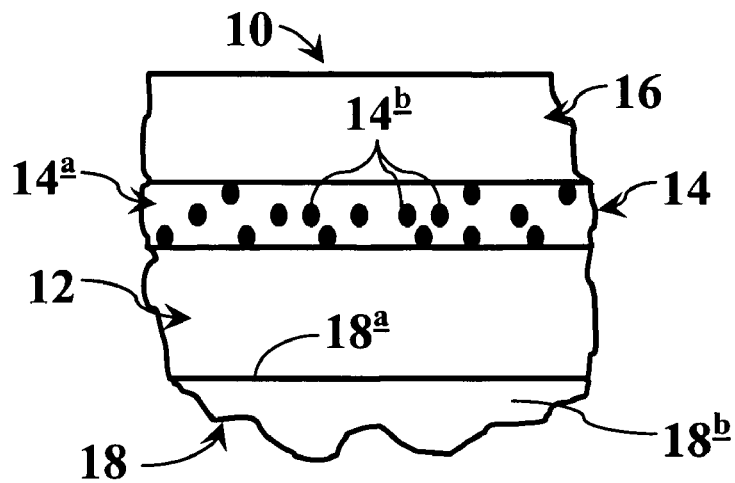
FIG. 1 is a simplified, fragmentary cross-sectional view of a portion of a metallic liquid container whose outside surface has been coated with a plural-layer, anti-leakage barrier structure including a central, composite-material layer which has been formed in accordance with practice of the present invention.

Turning now to the drawings, and referring first of all to FIG. 1, indicated generally at 10 is a three-layer, anti-leak barrier coating including layers 12, 14, 16 which have been applied by spraying to the outside surface 18a of the wall 18b in a metallic liquid container 18. For the purpose of illustration of the invention herein, it will be assumed that container 18 is a hydrocarbon fuel tank in a military fuel tanker vehicle (not shown)—a setting wherein the present invention has been found to offer particular utility.

In the specific barrier coating illustrated in FIG. 1, layers 12, 16 are substantially purely high-elastomer layers, each formed with a high-elastomeric material which is also referred to herein as a penetration-reaction material, and each having a layer thickness of about ¼-inches. Layer 14, which lies intermediate layers 12, 16, is a composite-material layer formed with a high-elastomeric body expanse, or body, 14a (penetration-reaction material) in which there exists a distribution of a plurality of liquid-imbiber, bead-like elements, or beads, 14b, also formed by what is referred to herein as a penetration-reaction material.

Further describing what is shown in FIG. 1, in the illustrated and generally described barrier coating 10, layers 12, 16 are each formed of the same high-elastomeric material which herein takes the form of the products bearing product code numbers 60012 and 60058 (now identified as Rexar MT FR 85-15, product number 60080), made by Rhino Linings USA, Inc. in San Diego, Calif., and sold under the trademark TUFF STUFF®. The reason for the presence of two product numbers is that this elastomeric material is formed, just prior to spray application to create layers 14, 16, by blending two, precursor, catalyzable, elastomeric materials which bear, respectively, these two different product numbers.

This same high-elastomeric material, for illustration purposes herein, is the material which forms body 14a in layer 14. The liquid imbiber beads distributed in layer 14 are formed herein of the material known as IMB230300, made by Imbibitive Technologies America, Inc. in Midland, Mich. Layer 14, very specifically, is the layer which is formed specifically in accordance with the features and practice of the present invention. In barrier coating 10 herein as illustrated, this layer has a thickness of about ⅛-inches.

Those skilled in the art should recognized that, while certain specific high-elastomeric and bead-like materials have been chosen as penetration-reaction materials for illustration of the present invention, and while a three-layer barrier coating having the layer thicknesses mentioned above has also been selected for illustration purposes, various other useful materials may be employed in the practice of the invention, and different layer counts and layer thicknesses may also be chosen for different specific applications.

With respect to spray application and creation of the several barrier-coating layers that are associated with implementation and practice of this invention, a word here about the use of a "receiving-surface" primer for layer adhesion assistance will be useful.

Where the receiving surface is either metal, or painted metal, that surface should be completely dry before primer application. For an unpainted metal surface, normally no special surface texturing is necessary before primer application. However, where painted metal is involved, paint-surface profiling to produce about a 1- to about a 3-mil texture is recommended.

To such a surface, an appropriate primer, such as the so-called System 251 primer made by Rhino Linings, USA, Inc. (mentioned above herein), may be used. This primer preferably is applied to create a primer layer having a thickness lying in the range of about 2- to about 5-mils. Manufacturer's instructions are entirely adequate to describe both the details of applying this primer to different surfaces, and the conditions which, after primer application, should be observed to indicate readiness of the primer to receive a sprayed overlayer, such as the innermost elastomeric layer discussed herein which lies closest to the outer surface of a protected liquid container.

After application of this innermost elastomeric layer, and with regard to the recommended use or non-use of such a primer in an interlayer manner as successive barrier-coating layers, such as layers 14, 16, are sprayed into place, we have found that no primer is needed if the relevant interlayer spray interval is less than about 4-hours. If such an interval is greater than about 4-hours, primer use is recommended. The same System 251 primer may be used for such interlayer conditions.

Where the receiving surface for the innermost, barrier-coating elastomeric layer is the outer surface of a plastic container, such as the outer surface of an HDPE fuel tank in a military vehicle, two things preferably should be done to prepare such a surface for elastomeric layer receipt. First, the surface should be scrubbed/scuffed, as with a rotary wire cup brush, to roughen the surface, and to remove any "surface gloss" of this surface. Next, an appropriate adhesion-promoting primer should be sprayed onto the scuffed surface. A suitable primer is the two-part catalyzed product known as DPX-801 plastic adhesive primer made by PPG Industries of Strongsville, Ohio.

Interlayer primer use here should be based upon the same time-interval consideration just discussed above, and an appropriate interlayer primer is the mentioned System 251 primer.

Returning to the main description of the present invention, as was mentioned above, the present invention focuses upon methodology specifically for creating, in a spray-application manner, composite-material layer 14.

Figure 2:
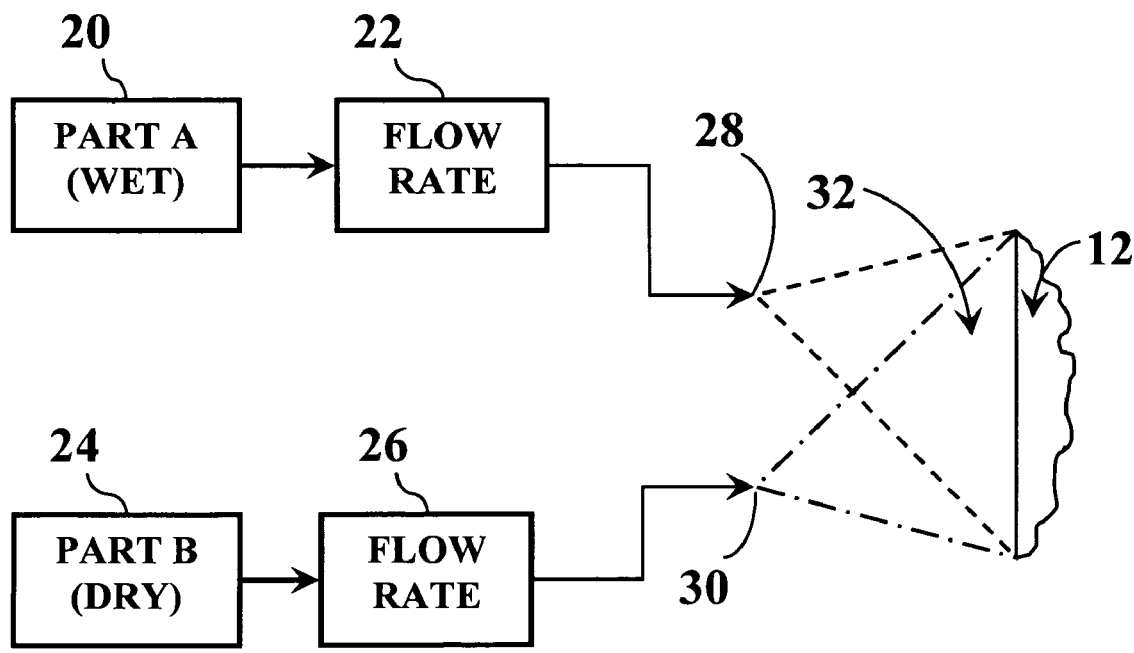
FIG. 2 is a simplified, block/schematic diagram of the basic architecture of the system and methodology of the present invention.

Turning to FIG. 2 in the drawings, here there is illustrated, at a relatively high schematic level, an overall "picture" of the architecture and practice of the present invention. This practice is illustrated in FIG. 2 with four blocks 20, 22, 24, 26, and by two spray instrumentalities (spray heads) 28, 30 which are represented in FIG. 2 by labeled arrowheads. According to the high-level illustration presented in FIG. 2, the present invention focuses on the spray formation of a composite-material layer, like layer 14, by creating two independent sprays of materials which are directed through independent spray heads, 28, 30 toward a target surface, such as the exposed surface of high-elastomeric layer 12. This is done in a fashion whereby the sprays emanating from these spray heads, by the time they arrive at the target surface, will have fully overlapped and merged to become united as a single-application spray.

In FIG. 2, the spray directed from spray head 28 is a spray of wet, two-part blended, liquid high-elastomeric material coming, in accordance with what is shown in FIG. 2, from block 20 wherein it is referred to as Part A. At this point in the process of the invention, Part A is a combination, or blend, of the two components which need to be brought together to create a resulting, catalyzable, high-elastomeric material. Flow rate from the supply of this elastomeric material is controlled in any suitable fashion, as is represented very generally by block 22 in FIG. 2.

Simultaneously, dry liquid-imbiber elements, or beads represented by block 24, and referred to in FIG. 2 as Part B, are directed ultimately for spraying by spray head 30 through a block 26 which represents any suitable form of flow-rate control for these beads.

According to practice of the invention, appropriate flow-rate controls for the two flows of the two materials are implemented in blocks 22, 26 to produce, in the region shown generally at 32 in FIG. 2, a merging and mingling blend of the wet, liquid elastomeric material and beads in a ratio determined to be the desired-by-weight final composition of the resulting spray-created composite-material layer. In the illustration of the invention now being detailed herein, this matter of flow-rate adjustment is performed in such a fashion that the resulting spray-applied composite layer will be represented about 22-percent by weight of the imbiber beads.

Not specifically illustrated in FIG. 2, but to be understood as being an important option offered in accordance with practice of the present invention, and to be more fully described shortly, is the fact that the relative positions of spray heads 28, 30, both laterally, and longitudinally (i.e., in a direction toward and away from a target surface) may be adjusted so as to provide a user with a relatively wide range of "fine tuning" control over the nature of the finally created, spray-applied, composite-material layer.

For example, by shifting the relative position of spray head 28 in a longitudinal sense, the length of time that the now curing, but still liquid, elastomeric material spends en route from the associated spray head to the target surface can be varied in a manner which thereby determines the state of curing of this material at the point in time when it strikes the target surface. By adjusting the relative lateral positions of the two spray heads, and to some extent by also controlling and adjusting the relative longitudinal positions of these two spray heads, the amount of time that the initially dry liquid-imbiber beads spend contactively engaged with still wet liquid elastomeric material may be controlled. This area of control plays a role in the manner in which, in the finally created composite layer, the liquid-imbiber beads function as liquid absorbers and three-dimensional swellers—two of the important mechanisms provided by these elements in defeating a puncture-produced leakage wound in a container, such as in container 18. This same set of relative adjustments that may be made between and in regard to the two spray heads, also plays a role in determining, to some extent, the manners in which the included liquid-imbiber beads in the final layer perform a coagulating response to leakage liquid—one of the other mechanisms employed in barrier coating 10 to close off a leakage wound.

Figure 3:
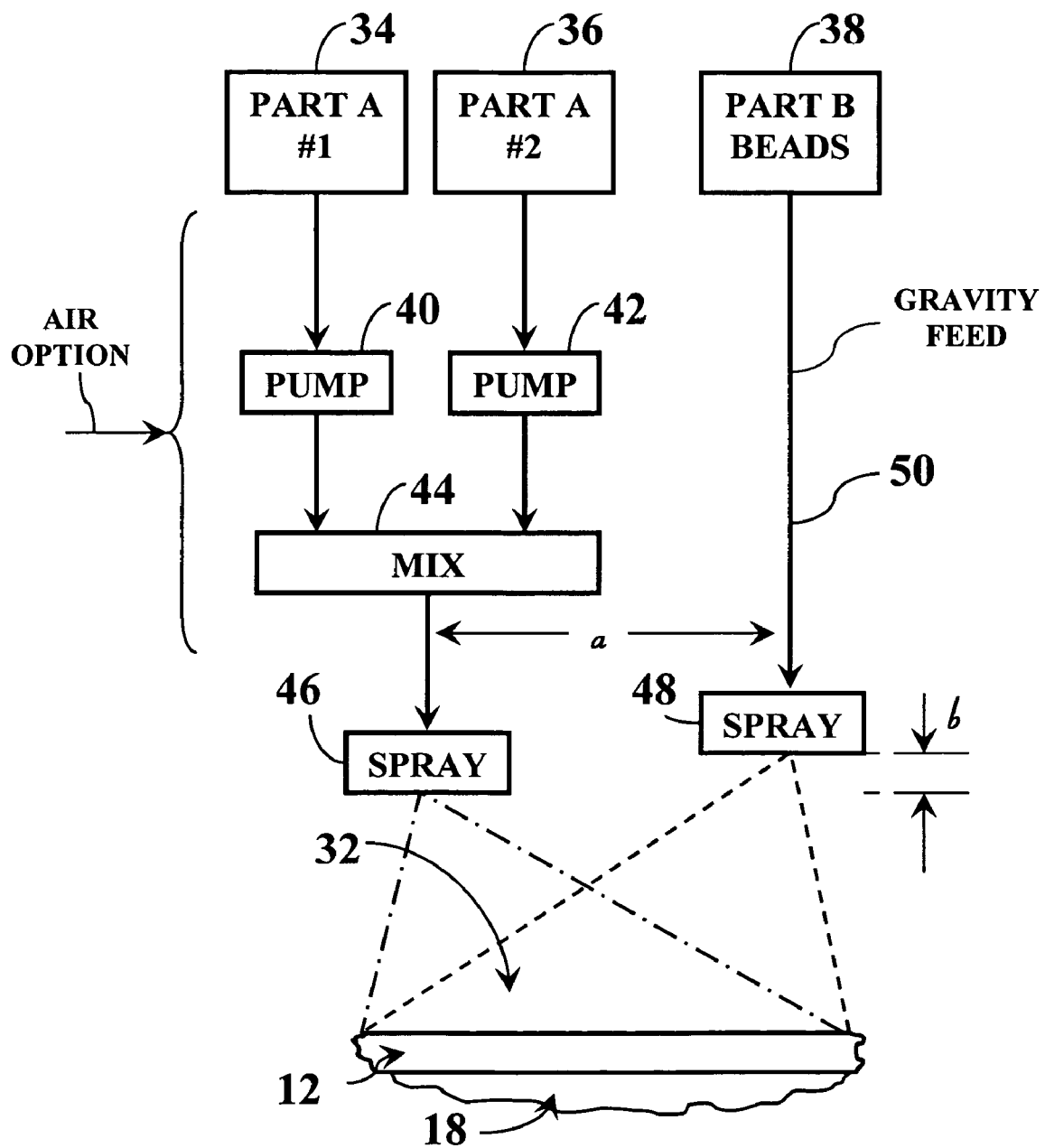
FIG. 3 is somewhat like FIG. 2, except that it provides a more detailed block/schematic view of the make up of the present invention.

FIG. 3 in the drawings is very much like FIG. 2, except that it illustrates the broadly presented practice seen in FIG. 2 in slightly greater detail. Eight blocks, 34, 36, 38, 40, 42, 44, 46, 48 are used in FIG. 3 to provide this more detailed view of practice of the invention. Blocks 34, 36, along with downstream block 44 in FIG. 3, generally relate to block 20 in FIG. 2, with blocks 40, 42 in FIG. 3 generally relating to block 22 in FIG. 2. Here what one sees is how the two precursor components of the above-mentioned elastomeric material are control-pumped to a region illustrated schematically by block 44 for mixing, and then on to spraying through a spray head represented by a block 46 in FIG. 3. Block 46 in FIG. 3 is related to arrowhead 28 in FIG. 2. Pumping performed by blocks 40, 42 enables flow-rate control with respect to the flow of wet, liquid elastomeric material.

Block 38 in FIG. 3 relates to block 24 in FIG. 2 regarding a supply of liquid-imbiber beads. A line 50 in FIG. 3 which connects block 38 with spray head 48, illustrated schematically an action of controlled gravity feed of beads from block 38 to block 48. This line represents flow-rate control as implemented by block 26 in FIG. 2.

Thus what is shown in FIG. 3 presents one particular way of implementing the practice of the present invention for the creation of a pair of air-blended sprays of liquid elastomeric material and dry, liquid-imbiber bead material, controlled in a fashion to yield a final composite-material layer, like layer 14, having the desired content of these two ingredients. In this figure, liquid elastomeric material is fed under positive pumping control, and liquid-imbiber beads are fed under controlled gravity-feed conditions.

At the left side of FIG. 3, an arrow which is marked "Air Option", and which relates, through the bracket touched by this arrow, to the operation of the supply of liquid elastomeric material, is presented in FIG. 3 to provide recognition that one option useable in conjunction with what is otherwise shown in FIG. 3 is the use of pressurized air at one or more appropriate locations to propel the delivery of liquid elastomeric material.

Also illustrated in FIG. 3, as between spray heads 46, 48, is a lateral offset labeled a and a longitudinal offset labeled b. In order to offer the kinds of spray-blending control possibilities suggested earlier herein, one will recognize that the values of offsets a and b may be adjusted in accordance with user desires.

Figure 4:
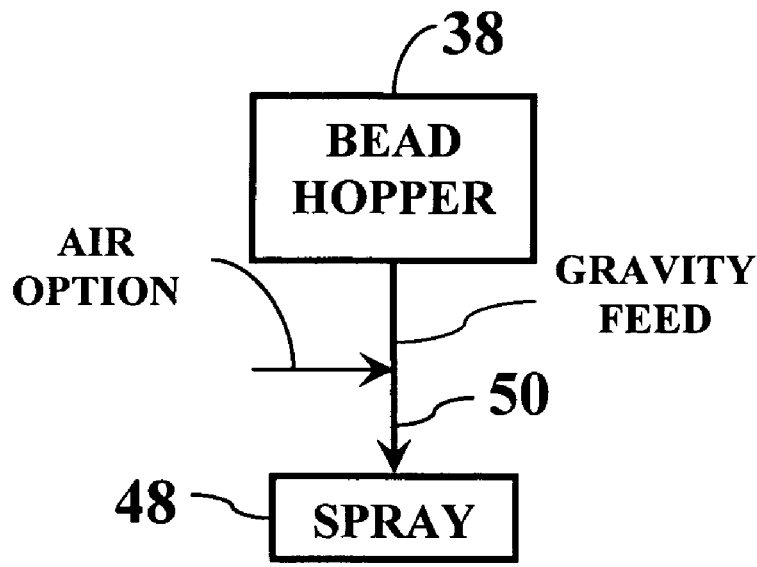
FIGS. 4 and 5 are relatable to what is shown on the right side of FIG. 3 with respect to illustrating several different manners/modalities of supplying a spray-implementable flow of liquid-imbiber beads which form part of the composite-material layer that is created by the present invention.
Figure 5:
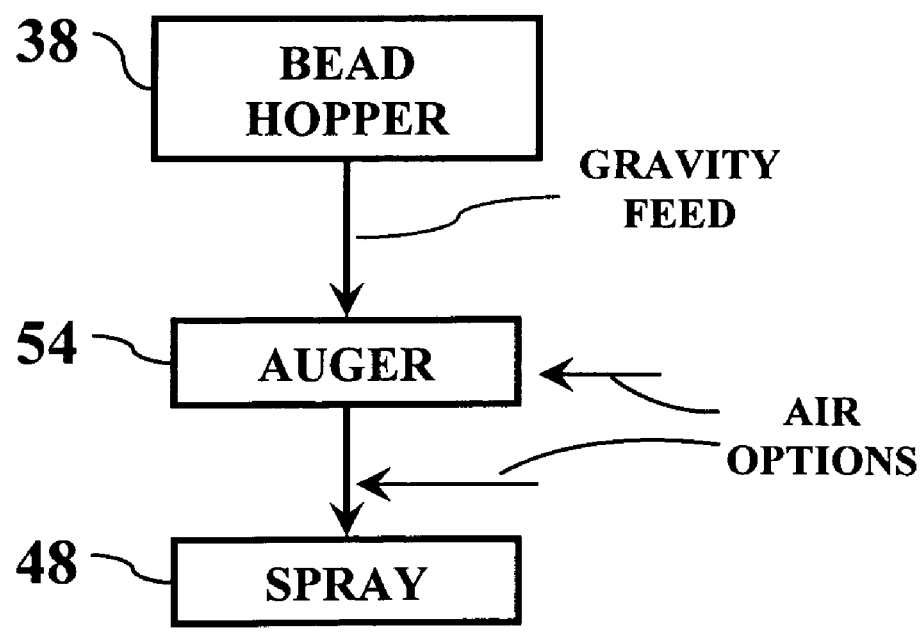

Turning now finally to FIGS. 4 and 5 in the drawings, here there are shown two additionally modified manners of practicing the invention, especially with respect to the way in which dry liquid-imbiber beads are fed to spray head 48.

In FIG. 4 what is pictured here is the possibility of using a compressed air option for aiding in the gravity feed of liquid-imbiber beads from block 38 to spray head 48.

In FIG. 5, an auger drive 54 is shown as a bead-feed option. This drive in disposed intermediate blocks 38, 48. Here too, two possible compressed air assist options are also illustrated as being selectable.

With respect to the various options shown in FIGS. 4 and 5, those skilled in the art will recognize that there are many specific ways and devices for implementing these options, knowledge about which is well within the understandings and skill levels of those generally skilled in the art. Accordingly, the details of these options, which do not form any part of the present invention, are not laid out in the text herein.

Thus, the present invention proposes a unique method for spray-creating a composite-material layer useable in a plural-layer coating which is to be applied to the outside surface of a liquid container to defeat liquid leakage following a projectile penetration of the container, utilizing, in the creation of such a layer, a blend of first and second, penetration-reaction materials including, as a first penetration-reaction material, a high-elastomeric body-forming material, and as a second penetration-reaction material, liquid-imbibing bead-like elements. The method includes the steps of (a) defining a desired-by-weight final percentage blend of these two materials, where the weight contribution of the first material is the larger-percentage contributor to the final composite-material layer, and (b) creating side-by-side, differentiated, simultaneous sprays of the two materials to be blended en route toward the region of a target liquid container, with the flow rate of the first penetration-reaction material being adjusted during spraying to be greater than that of the second penetration-reaction material by an amount designed to achieve the desired, final, percentage-by-weight sprayed-layer blend. Several alternative approaches are described and illustrated for developing a flow of the liquid-imbibing bead-like elements.

Accordingly, while a preferred and best mode manner for practicing the present invention to create the type of composite-material barrier-coating layer described herein has been specifically set forth in this disclosure, and while several variations have also been suggested, it is appreciated that, in the hands of those who are skilled in the art, other variations and modifications may be made without departing from the spirit of the invention, and it is intended that all such variations and modifications be treated as coming within the scope of the claims to invention which now follow.

We claim:

1. A method for spray-creating a liquid fuel reactive composite-material layer useable in a self-sealing coating applied to the outside surface of a target liquid container for defeating a puncture-produced leakage wound in that container utilizing an air-formed, pre-impingement blend of a first, initially wet, but subsequently curable-to-dry, liquid fuel reactive, high-elastomeric body-forming material, and a second, dry, liquid fuel reactive, liquid-imbibing, bead-element, material, said method comprising creating differentiated, simultaneous sprays of desire-relative-percentage amounts of these two materials, using a first spray head for spraying the first material and a second spray head for spraying the second material, and performing said creating so that, during materials spraying, the two materials become contact-blended in air into a composite spray en route toward a target liquid container, with the sprays, in the air, becoming fully overlapped and merged as a completed, combined, composite-material blend by the time that the merged and combined sprays reach and effectively impinge the target liquid container, and as a part of said creating, controlling the amount of en route, inter-material, pre-impingement, contact blend time between the two materials via positioning the spray heads relative to one another and relative to the outside surface of the liquid container, and by said positioning, adjusting the length of time in air that the second, bead-element material is in contact with the first material so as ultimately to control the liquid fuel reactive characteristics of the intended, composite-material layer.

\* \* \* \* \*

UNITED STATES PATENT AND TRADEMARK OFFICE
CERTIFICATE OF CORRECTION

PATENT NO. : 8,389,063 B2
APPLICATION NO. : 12/380344
DATED : March 5, 2013
INVENTOR(S) : Thomas S. Ohnstad et al.

It is certified that error appears in the above-identified patent and that said Letters Patent is hereby corrected as shown below:

Title Page Item (73) Assignee: "High Impact Technology, Inc., Tigard, OR (US)" should read
--High Impact Technology, LLC, Tigard, OR (US)--

Signed and Sealed this
Eleventh Day of June, 2013

Teresa Stanek Rea
*Acting Director of the United States Patent and Trademark Office*